(12) United States Patent
Mostafa et al.

(10) Patent No.: US 11,928,107 B2
(45) Date of Patent: Mar. 12, 2024

(54) SIMILARITY-BASED VALUE-TO-COLUMN CLASSIFICATION

(71) Applicant: INTERNATIONAL BUSINESS MACHINES CORPORATION, Armonk, NY (US)

(72) Inventors: Mohammed Mostafa, Kanata (CA); Ali Khanafer, Ottawa (CA); Mohamad F. Kalil, Ottawa (CA); Mohamed El Gemaiey, Ottawa (CA); Morvarid Sehatkar, Ottawa (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 581 days.

(21) Appl. No.: 16/881,253

(22) Filed: May 22, 2020

(65) Prior Publication Data
US 2021/0365443 A1    Nov. 25, 2021

(51) Int. Cl.
*G06F 16/248*    (2019.01)
*G06F 16/22*    (2019.01)
(Continued)

(52) U.S. Cl.
CPC .......... *G06F 16/243* (2019.01); *G06F 16/221* (2019.01); *G06F 16/24578* (2019.01); *G06F 16/2458* (2019.01); *G06F 16/248* (2019.01)

(58) Field of Classification Search
CPC .. G06F 16/2458; G06F 16/221; G06F 16/243; G06F 16/285; G06F 16/355; G06F 16/35
See application file for complete search history.

(56) References Cited

U.S. PATENT DOCUMENTS 6,088,692 A    7/2000    Driscoll
8,359,282 B2   1/2013    Bai et al.
(Continued)

FOREIGN PATENT DOCUMENTS

CN    100595763 C    3/2010
DE    19952769 A1    7/2008

OTHER PUBLICATIONS

Chen et al., "Method and System for Providing a Sub-Linear Computational Model for Searching Look-Alike Entities in Massive-Scale Data", https://priorart.ip.com/IPCOM/000257115, Jan. 15, 2019, 7 pages.
(Continued)

*Primary Examiner* — Robert W Beausoliel, Jr.
*Assistant Examiner* — Pedro J Santos
(74) *Attorney, Agent, or Firm* — Eric Chesley; Andrew D. Wright; Calderon Safran & Cole, P.C

(57) ABSTRACT

Methods and systems for similarity-based value-to-column classification are disclosed. A method includes: receiving, by a computing device, a natural language search query; determining, by the computing device, a filtering phrase in the natural language search query using a natural language understanding model; encoding, by the computing device, the filtering phrase; retrieving, by the computing device, a plurality of encoded columns; for each of the plurality of encoded columns, the computing device determining a similarity score based on a similarity between the encoded filtering phrase and the encoded column; and outputting, by the computing device, a column corresponding to an encoded column of the plurality of encoded columns having a highest similarity score.

19 Claims, 5 Drawing Sheets

(51) Int. Cl.
    *G06F 16/242*     (2019.01)
    *G06F 16/2457*     (2019.01)
    *G06F 16/2458*     (2019.01)

(56) References Cited

U.S. PATENT DOCUMENTS

| | | | |
|---|---|---|---|
| 8,775,442 | B2 | 7/2014 | Moore et al. |
| 9,477,729 | B2 | 10/2016 | Bhattiprolu et al. |
| 10,445,062 | B2 | 10/2019 | Oberbreckling et al. |
| 2009/0006326 | A1* | 1/2009 | Liu .................. G06Q 30/02 |
| 2018/0341839 | A1* | 11/2018 | Malak .............. G06F 40/30 |
| 2019/0121841 | A1* | 4/2019 | Sbodio ............. G06F 40/279 |
| 2020/0005194 | A1* | 1/2020 | Rao .................. G06F 16/40 |
| 2020/0201866 | A1* | 6/2020 | Fedorocko ....... G06F 16/2264 |
| 2020/0210520 | A1* | 7/2020 | Akyamac .......... G06N 5/046 |
| 2020/0410011 | A1* | 12/2020 | Shi .................. G06N 20/20 |
| 2021/0019309 | A1* | 1/2021 | Yadav ............... G06F 16/248 |
| 2021/0201143 | A1* | 7/2021 | Choi ................ G06N 3/0454 |
| 2021/0294794 | A1* | 9/2021 | Bordawekar ..... G06F 16/243 |
| 2021/0406452 | A1* | 12/2021 | Hasan ............... G06N 5/02 |

OTHER PUBLICATIONS

Anonymous, "MySQL Internals Manual/Important Algorithms and Structures/Full-Text Search," https://dev.mysql.com/doc/internals/en/full-text-search.html, available Dec. 4, 2019, 5 pages.

\* cited by examiner

500

| Product | Sales | City |
|---|---|---|
| PhoneX | 100 | Ottawa |
| PhoneX | 2000 | Toronto |
| TabletX | 50 | Ottawa |
| BrandY PhoneY | 1000 | Toronto |
| BrandY TabletY | 30 | Montreal |
| GamingSystemY | 600 | Ottawa |

FIG. 5

SIMILARITY-BASED VALUE-TO-COLUMN CLASSIFICATION

BACKGROUND

Aspects of the present disclosure generally relate to computing devices and, more particularly, to methods and systems for similarity-based value-to-column classification.

In conversational business intelligence (BI) systems, a natural language search query typically contains filtering phrases referencing specific columns in a dataset (database). For instance, "sales in Ottawa" could be a query involving a location column in the database, where Ottawa is the filter to be applied. Identifying the relevant columns from the source (dataset) typically requires indexing the distinct values of each categorical column in the dataset.

SUMMARY

In a first aspect of the disclosure, there is a method that includes: receiving, by a computing device, a natural language search query; determining, by the computing device, a filtering phrase in the natural language search query using a natural language understanding model; encoding, by the computing device, the filtering phrase; retrieving, by the computing device, a plurality of encoded columns; for each of the plurality of encoded columns, the computing device determining a similarity score based on a similarity between the encoded filtering phrase and the encoded column; and outputting, by the computing device, a column corresponding to an encoded column of the plurality of encoded columns having a highest similarity score.

In another aspect of the disclosure, there is a computer program product that includes one or more computer readable storage media having program instructions collectively stored on the one or more computer readable storage media. The program instructions are executable to: for each of a plurality of columns in a dataset: collect a plurality of samples from the column; encode each of the plurality of samples to create a plurality of sample embedding; encode the column using the plurality of sample embeddings to create a column embedding; and store the column embedding in a content store.

In another aspect of the disclosure, there is a system that includes: a processor, one or more computer readable storage media, and program instructions collectively stored on the one or more computer readable storage media. The program instructions are executable to: receive a natural language search query; determine a filtering phrase in the natural language search query; encode the filtering phrase; retrieve a plurality of encoded columns; for each of the plurality of encoded columns, determine a similarity score based on a similarity between the encoded filtering phrase and the encoded column; and output a column corresponding to an encoded column of the plurality of encoded columns having a highest similarity score.

BRIEF DESCRIPTION OF THE DRAWINGS

Aspects of the present disclosure are described in the detailed description which follows, in reference to the noted plurality of drawings by way of non-limiting examples of exemplary embodiments of the present disclosure.

FIG. 5 shows an example of a table that includes sample values from a table in a dataset according to an embodiment.

DETAILED DESCRIPTION

Figure 1:
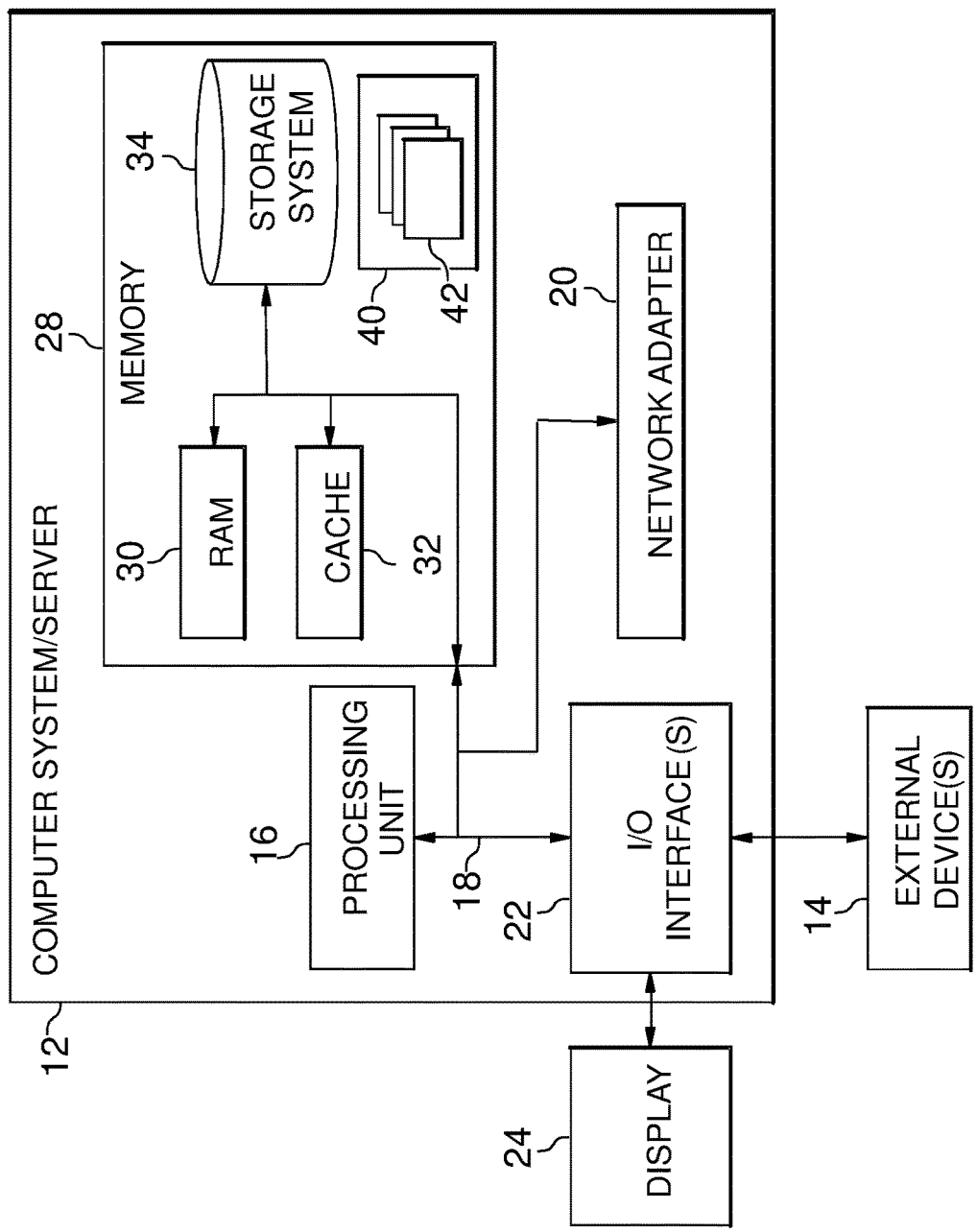
FIG. 1 depicts a computer system in accordance with aspects of the disclosure.

Aspects of the present disclosure generally relate to computing devices and, more particularly, to methods and systems for similarity-based value-to-column classification. As described herein, aspects of the disclosure include a method and system that use unsupervised or semi-supervised algorithms to encode each column in a dataset using sample values and use those column encodings to perform value-to-column classification. In embodiments, the column encodings are generated using transformations of pre-trained word embeddings which capture semantic relations among words and are used to classify out-of-sample values to the correct columns. In embodiments, values are classified to columns with high accuracy for various types of datasets.

In embodiments, sample values from each column in a dataset are used as input, and using pre-trained word embeddings, embeddings are formed for each column based on the sample values. In embodiments, using these column embeddings, similarity matching is then performed to match filter phrases to columns. In embodiments, due to the ability of word embeddings to capture semantic relations between words, values are accurately matched to columns, even for values that were not part of the samples (out-of-sample values).

For systems with limited infrastructure, the conventional method of indexing each and every column in a dataset becomes computationally expensive, particularly with large datasets. Embodiments address these problems with conventional methods and systems by providing an unsupervised or semi-supervised machine learning approach to accurately identify relevant columns from a dataset for a given input query. In particular, embodiments can improve the functioning of a computer by providing methods and systems for using unsupervised or semi-supervised algorithms to encode each column in a dataset using sample values and using those column encodings to perform value-to-column classification. Accordingly, through the use of rules that can improve computer-related technology, implementations of the disclosure allow computer performance of functions not previously performable by a computer. Additionally, implementations of the disclosure use techniques that are, by definition, rooted in computer technology (e.g., machine learning and neural networks). It is to be understood that the aforementioned advantages, as well as other advantages described herein, are example advantages and should not be construed as limiting. Embodiments of the present disclosure can contain all, some, or none of the advantages while remaining within the spirit and scope of the present disclosure.

In embodiments, a computer-implemented process for similarity based matching includes: in response to importing raw data, collecting a set of samples from each column of the raw data, wherein a sample containing one or more words expressed as tokens represents one value in a row in a column; encoding each sample in the set of samples by a similarity engine, using an unsupervised learning technique selected from a first set of techniques including computation of an average, a sum, a combination of embeddings of tokens, and a capture of contextual information using a predetermined sentence encoder; encoding each column using an encoding technique selected from a second set of techniques including averaged based encoding and multi-centroid based encoding; storing a result of the encoding each column in a content store; in response to receiving a query including a sentence, passing the sentence through a natural language understanding model to identify filtering phrases in the sentence; encoding the filtering phrases of the query by the similarity engine using a same technique previously used to encode the set of samples; computing a similarity between the query and each of the column encodings (for example a centroid) by the similarity engine loading computed column encodings into memory and using a predetermined technique; and in response to determining a set of similarities, returning a number of columns having similarity values meeting a predetermined threshold value, wherein the number is configured based on an application associated with the query.

To the extent the implementations collect, store, or employ personal information of individuals, it should be understood that such information shall be used in accordance with all applicable laws concerning protection of personal information. Additionally, the collection, storage, and use of such information may be subject to advance notification and consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
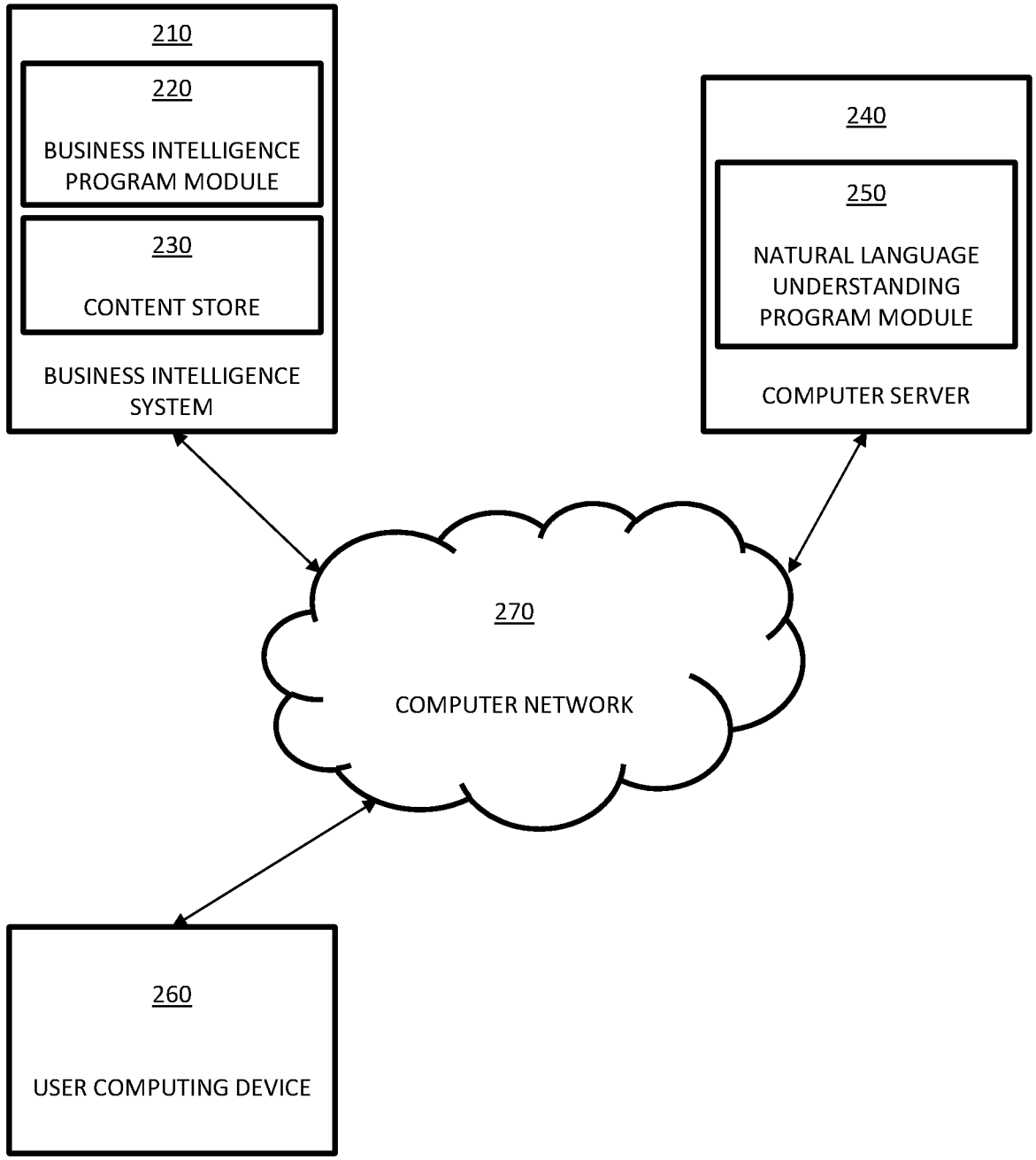
FIG. 2 depicts an illustrative environment in accordance with aspects of the disclosure.

FIG. 2 depicts an illustrative environment 200 in accordance with aspects of the disclosure. As shown, the environment 200 comprises a business intelligence system 210, a computer server 240, and a user computing device 260 which are in communication via a computer network 270. In embodiments, the computer network 270 is any suitable network including any combination of a LAN, WAN, or the Internet. In embodiments, the business intelligence system 210, the computer server 240, and the user computing device 260 are physically collocated, or, more typically, are situated in separate physical locations.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200.

In embodiments, the business intelligence system 210 is a computer device comprising one or more elements of the computer system/server 12 (as shown in FIG. 1). In particular, the business intelligence system 210 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the business intelligence system 210 includes a business intelligence program module 220, which comprises one or more of the program modules 42 shown in FIG. 1. In embodiments, the business intelligence program module 220 includes program instructions for a conversational business intelligence system that performs similarity-based value-to-column classification. In embodiments, the program instructions included in the business intelligence program module 220 of the business intelligence system 210 are executed by one or more hardware processors.

Additionally, in embodiments, the business intelligence system 210 includes a content store 230 that includes a dataset (database) used by the business intelligence program module 220. In embodiments, the content store 230 is implemented as hardware and/or software using components such as relational databases, non-relational databases, and/or storage devices.

Still referring to FIG. 2, in embodiments, the computer server 240 is a computer device comprising one or more elements of the computer system/server 12 (as shown in FIG. 1). In particular, the computer server 240 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the computer server 240 includes a natural language understanding program module 250, which comprises one or more of the program modules 42 shown in FIG. 1. In embodiments, the natural language understanding program module 250 includes program instructions for a natural language understanding model that is used by the business intelligence program module 220 of the business intelligence system 210. In embodiments, the program instructions included in the natural language understanding program module 250 of the computer server 240 are executed by one or more hardware processors.

Still referring to FIG. 2, in embodiments, the user computing device 260 is a computer device comprising one or more elements of the computer system/server 12 (as shown in FIG. 1). In other embodiments, the user computing device 260 is a desktop computer, a laptop computer, a mobile device such as a cellular phone, tablet, personal digital assistant (PDA), or other computing device.

Figure 3:
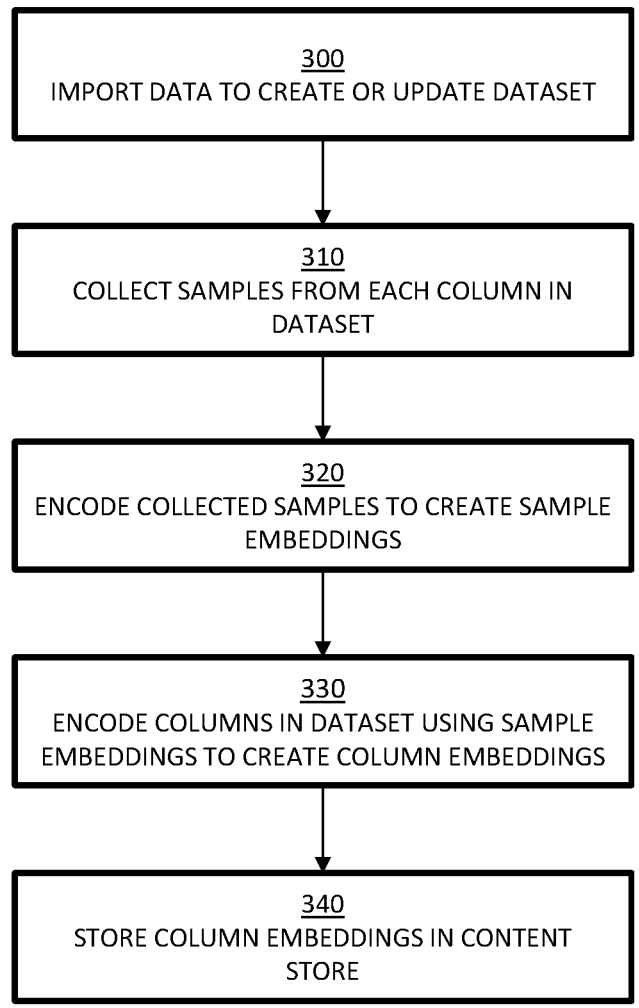
FIGS. 3 and 4 depict flowcharts of exemplary methods performed in accordance with aspects of the disclosure.

FIG. 3 depicts a flowchart of an exemplary method for encoding a dataset and creating embeddings for each column in the dataset that is performed by the business intelligence program module 220 of the business intelligence system 210 in accordance with aspects of the disclosure. The operations of the method may be performed in the environment of FIG. 2 and are described with reference to the elements shown in FIG. 2.

At operation 300, the business intelligence system 210 imports data to create or update a dataset. In embodiments, operation 300 comprises the business intelligence program module 220 of the business intelligence system 210 receiving raw data (e.g., from the user computing device 260) to store in a dataset in the content store 230. In embodiments, the received data includes a plurality of columns (e.g., "Product", "Sales", "City") and a plurality of rows including values for each of the plurality of columns (e.g., "Product1", 100, "Ottawa"). In embodiments, the business intelligence program module 220 creates and/or updates the dataset in the content store 230 using the received data.

Still referring to FIG. 3, at operation 310, the business intelligence system 210 collects samples from each column in the dataset. In embodiments, operation 310 comprises the business intelligence program module 220 of the business intelligence system 210 collecting a predetermined number of sample values from each of the columns in the dataset stored in the content store 230. In an example, the business intelligence program module 220 of the business intelligence system 210 randomly selects 50 values stored in each of the columns in the dataset stored in the content store 230 as sample values. In other embodiments, different predetermined numbers of samples are collected from each of the columns in the dataset stored in the content store 230. In embodiments, the predetermined number is configurable by an administrator or other user of the business intelligence system 210. In still other embodiments, the business intelligence program module 220 of the business intelligence system 210 randomly selects a predetermined percentage of the values in each of the columns in the dataset stored in the content store 230 as samples.

Still referring to FIG. 3, at operation 320, the business intelligence system 210 encodes the collected samples to create sample embeddings. In embodiments, operation 320 comprises, for each of the columns in the dataset stored in the content store 230, the business intelligence program module 220 of the business intelligence system 210 applying an unsupervised or semi-supervised algorithm such as word2vec to encode each of the samples collected from the column at operation 310 to create sample embeddings.

Still referring to operation 320, in embodiments, a sample represents one value (row) in a column. A sample may contain multiple words, each of which is treated as a token. In embodiments, the business intelligence program module 220 generates a word embedding using a neural network such as word2vec. In particular, in embodiments, the business intelligence program module 220 uses word2vec to map each token to a vector of real numbers, thereby creating an embedding of each token. In embodiments, the business intelligence program module 220 of the business intelligence system 210 computes the embedding of a given sample using the average, sum, element-wise max, element-wise min, or any other combination of the embeddings of its tokens. In other embodiments, to capture contextual information, the business intelligence program module 220 of the business intelligence system 210 computes the embedding of a given sample using sentence encoders such as doc2vec or Google® (a registered trademark of Google LLC) Universal Sentence Encoder.

Still referring to FIG. 3, at operation 330, the business intelligence system 210 encodes columns in the dataset using the sample embeddings to create column embeddings. In embodiments, operation 330 comprises the business intelligence program module 220 of the business intelligence system 210 encoding each of the columns in the dataset stored in the content store 230 using the sample embeddings created at operation 320 to create column embeddings.

Still referring to operation 330, in embodiments, the business intelligence program module 220 uses an average-based encoding approach to create the column embeddings. In embodiments, the business intelligence program module 220 encodes each column into a single vector. The business intelligence program module 220 computes the vector based on a weighted average of the sample embeddings for each column created at operation 320. In embodiments, the weights used by the business intelligence program module 220 are uniform. In other embodiments, the weights used by the business intelligence program module 220 are computed using any criteria, for example, by applying Term Frequency-Inverse Document Frequency (TF-IDF) algorithm across the columns of the table.

Still referring to operation 330, in other embodiments, the business intelligence program module 220 uses a multi-centroid-based encoding approach to create the column embeddings. Columns may contain values that are semantically very different; hence, in this case, averaging the embeddings of those values may lead to loss of information and poor classification performance. An alternative approach used by the business intelligence program module 220 in this case is to encode each column with multiple vectors. In embodiments, to find these vectors, the business intelligence program module 220 applies clustering algorithms. In an example, the business intelligence program module 220 applies k-means clustering over the sample embeddings for each column created at operation 320. In embodiments, the business intelligence program module 220 selects a number of vectors k to represent each column via hyperparameter tuning and based on system resources of the business intelligence system 210. In embodiments, there is a trade-off between the number of clusters chosen and the time required by the business intelligence program module 220 to classify queries.

Still referring to FIG. 3, at operation 340, the business intelligence system 210 stores the column embeddings in the content store 230. In embodiments, operation 340 comprises the business intelligence program module 220 of the business intelligence system 210 storing the column embeddings created at operation 330 in the content store 230.

Figure 4:
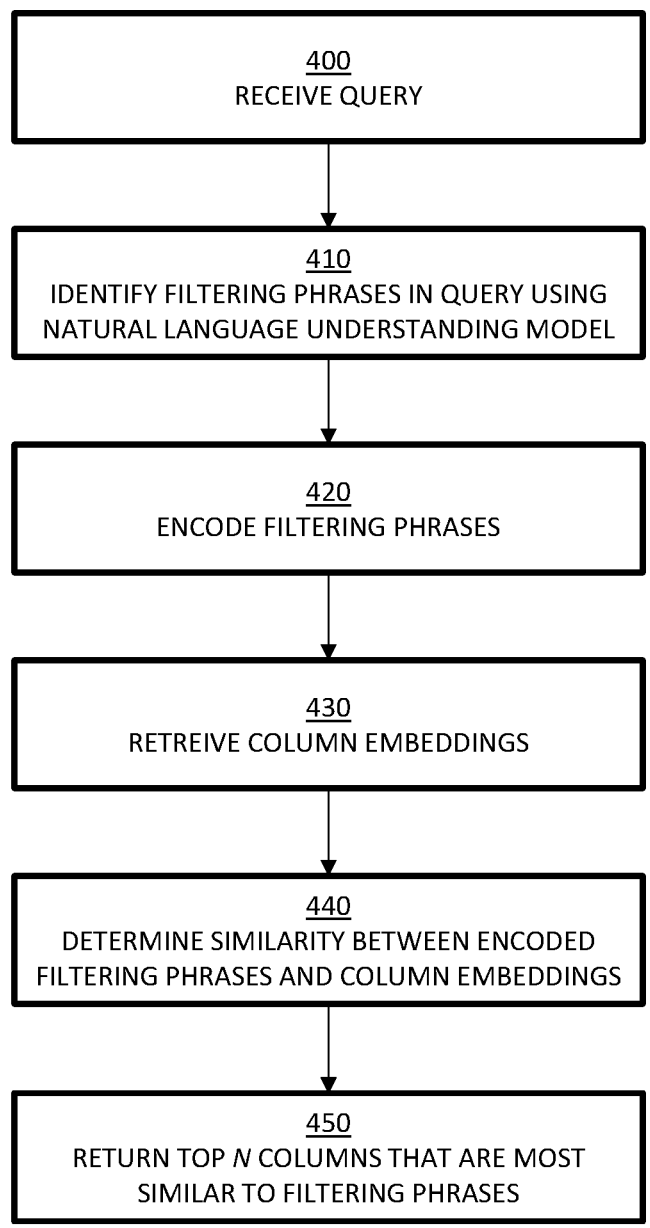

FIG. 4 depicts a flowchart of an exemplary method for using the column embeddings created according to the method of FIG. 3 to map (classify) filter values to columns in the dataset that is performed by the business intelligence program module 220 of the business intelligence system 210 in accordance with aspects of the disclosure. The operations of the method may be performed in the environment of FIG. 2 and are described with reference to the elements shown in FIG. 2.

At operation 400, the business intelligence system 210 receives a query. In embodiments, operation 400 comprises the business intelligence program module 220 of the business intelligence system 210 receiving the query (e.g., a query entered by a user of the user computing device 260) from the user computing device 260. In embodiments, the received query is a natural language search query such as a sentence or sentence fragment that contains one or more filtering phrases implicitly referencing specific columns in the dataset stored in the content store 230 of the business intelligence system 210. In an example, the query "Show ProductX sales in Los Angeles" is received from the user computing device 260.

Still referring to FIG. 4, at operation 410, the business intelligence system 210 identifies filtering phrases in the query using a natural language understanding model. In embodiments, operation 410 comprises the business intelligence program module 220 of the business intelligence system 210 sending the query received at operation 400 to the natural language understanding program module 250 of the computer server 240. The natural language understanding program module 250 of the computer server 240 then identifies filtering phrases (e.g., expressions or conditions that are used to limit results returned in response to the query) in the query received from the business intelligence program module 220 of the business intelligence system 210. The natural language understanding program module 250 of the computer server 240 then sends the identified filtering phrases to the business intelligence program module 220 of the business intelligence system 210. In an example, the natural language understanding program module 250 receives the query "Show ProductX sales in Los Angeles", identifies "ProductX" and "Los Angeles" as filtering phrases using a natural language understanding model, and sends the identified filtering phrases to the business intelligence program module 220.

Still referring to FIG. 4, at operation 420, the business intelligence system 210 encodes the filtering phrases. In embodiments, operation 420 comprises the business intelligence program module 220 of the business intelligence system 210 encoding the filtering phrases identified at operation 410 (e.g., using word2vec) to create filtering phrase word embeddings. In embodiments, at operation 420, the business intelligence program module 220 uses the same method (e.g., averaging the embeddings of the individual tokens or using a sentence encoder) to encode the filtering phrases as used at operation 320 of FIG. 3 to encode the samples.

Still referring to operation 420, in embodiments, a filtering phrase may contain multiple words (e.g., "Los Angeles"), each of which is treated as a token. In embodiments, the business intelligence program module 220 generates a word embedding using a neural network such as word2vec. In particular, in embodiments, the business intelligence program module 220 uses word2vec to map each token to a vector of real numbers, thereby creating an embedding of each token. In embodiments, the business intelligence program module 220 of the business intelligence system 210 encodes the filtering phrase using the average, sum, or any other combination of the embeddings of its tokens, when this same method is used to create the sample embeddings at operation 320. In other embodiments, to capture contextual information, the business intelligence program module 220 of the business intelligence system 210 encodes the filtering phrase using sentence encoders such as doc2vec, Google® (a registered trademark of Google LLC) Universal Sentence Encoder, Embeddings from Language Models (ELMo), or Bidirectional Encoder Representations from Transformers (BERT) when this same method is used to create the sample embeddings at operation 320.

Still referring to FIG. 4, at operation 430, the business intelligence system 210 retrieves the column embeddings. In embodiments, operation 430 comprises the business intelligence program module 220 of the business intelligence system 210 retrieving the column embeddings generated according to the method of FIG. 3 from the content store 230 of the business intelligence system 210 and loading the retrieved column embeddings into memory.

Still referring to FIG. 4, at operation 440, the business intelligence system 210 determines the similarity between the encoded filtering phrases and the column embeddings. In embodiments, operation 440 comprises the business intelligence program module 220 of the business intelligence system 210 determining the similarity between each of the filtering phrases encoded at operation 420 and each of the columns represented by column embeddings retrieved at operation 430 by determining a similarity score using distance measures such as Cosine similarity or Euclidean distance. In embodiments, for a multi-centroid based encoding, the similarity score between the encoded filtering phrase and the encoded column is chosen as the highest similarity score between the encoded filtering phrase and each centroid in the column embedding. In other embodiments, other techniques may be used, such as the average similarity scores or any combination of similarity scores of the encoded filtering phrase and centroids. In embodiments, a relatively higher similarity score indicates that a filtering phrase corresponding to the encoded filtering phrase and a column corresponding to the column embedding are relatively more similar, and a relatively lower similarity score indicates that a filtering phrase corresponding to the encoded filtering phrase and a column corresponding to the column embedding are relatively less similar.

Still referring to FIG. 4, at operation 450, the business intelligence system 210 returns the top n columns that are most similar to the filtering phrases. In embodiments, operation 450 comprises the business intelligence program module 220 of the business intelligence system 210 outputting the top n columns from the dataset stored in the content store 230 of the business intelligence system 210 that are most similar to the filtering phrases identified at operation 410 that are in the query received at operation 400. In embodiments, the business intelligence program module 220 executes the query received at operation 400, filtering on the returned columns. In other embodiments, the business intelligence program module 220 transmits the returned columns to the user computing device 260, e.g., for display on a user interface.

Still referring to operation 450, in embodiments, the top n columns that are most similar to the filtering phrases are the n columns having the n highest similarity scores as determined at operation 440. In embodiments, the number of columns n is a predetermined number that is determined based on an application (e.g., an application used by the user of the user computing device 260).

Still referring to operation 450, in embodiments, the top n columns are used as a filter for a query. In an example, n is 1, and the dataset stored in the content store 230 includes the columns "Product", "Sales", and "City". At operation 400, the query "Show ProductX sales in Los Angeles" is received. At operation 410, "ProductX" and "Los Angeles" are identified as filtering phrases. At operation 450, the top 1 column corresponding to "ProductX" is the "Product" column in the dataset stored in the content store 230, and the top 1 column corresponding to "Los Angeles" is the "City" column in the dataset stored in the content store 230. Accordingly, at operation 450, the "Product" and "City" columns are used as filters for the query, such that "Product" equals "ProductX" and "City" equals "Los Angeles". Accordingly, in response to the query received at operation 400, the business intelligence program module 220 of the business intelligence system 210 shows sales for the "Product" that is "ProductX" in the "City" that is "Los Angeles".

In embodiments, the business intelligence program module 220 of the business intelligence system 210 performs per-token classification for sample values that contain multiple words (tokens). In particular, in embodiments, the business intelligence program module 220 treats each token as an individual sample for both embedding (e.g., at operation 320 of FIG. 3) and inference (e.g., at operations 420 and 440 of FIG. 4). In an example, a dataset stored in the content store 230 of the business intelligence system 210 includes the columns "Product", "Sales", and "City". The business intelligence program module 220 treats the filtering phrase "BrandX Tablet" (e.g., identified at operation 410) as two separate values: "BrandX" and "Tablet" (e.g., during encoding at operation 420 and determining similarity scores at operation 440). In embodiments, for each token in the filtering phrase, a similarity score is computed, and then a combined similarity score for the filtering phrase is determined based on the similarity scores for all of the tokens in the filtering phrase.

In embodiments, the business intelligence program module 220 of the business intelligence system 210 combines side features with the semantic similarity between words in order to improve the classification performance. In embodiments, the length of the filtering phrase is an example of a side feature that can improve the classification performance. For example, consider two columns in a movies-related dataset: "Movie Title" and "Genre". The two columns may be semantically related, e.g., the genre "biography" is semantically similar to a title that includes the word "memoir". However, the lengths of samples of the "Movie Title" column are typically larger than those of the "Genre" column. In embodiments, the business intelligence program module 220 uses this information to improve the accuracy of the classification.

FIG. 5 shows an example of a table 500 that includes sample values from a sales table for a particular store in a dataset stored in the content store 230 of the business intelligence system 210 according to an embodiment. The table 500 includes "Product", "Sales", and "City" columns. In an example, the business intelligence program module 220 of the business intelligence system 210 receives a query, "show GamingSystemX sales in Vancouver" at operation 400 of FIG. 4. At operation 410, the natural language understanding program module 250 of the computer server 240 identifies the filtering phrases "GamingSystemX" and "Vancouver". Although "GamingSystemX" is not included in the sample shown in table 500, the business intelligence program module 220 matches "GamingSystemX" to the "Product" column. This is due to the fact that the word embedding of "GamingSystemX" is closer to the embeddings of the samples in the "Product" column than to those in the "City" column. Similarity, the business intelligence program module 220 matches "Vancouver" to the "City" column, although it was not included in the sample shown in table 500. The business intelligence program module 220 of the business intelligence system 210 therefore does not need to index all of the distinct values in a given table. In light of this fact, the business intelligence program module 220 may be used in any system that requires information retrieval when indexing distinct values is too expensive.

In embodiments, a service provider could offer to perform the processes described herein. In this case, the service provider can create, maintain, deploy, support, etc., the computer infrastructure that performs the process operations of the disclosure for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, embodiments provide a computer-implemented method, via a network. In this case, a computer infrastructure, such as computer system/server 12 (FIG. 1), can be provided and one or more systems for performing the processes of the disclosure can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the disclosure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   collecting, by a computing device, samples from a plurality of columns of a dataset;
   encoding, by the computing device, the samples using a semi-supervised algorithm, thereby creating sample embeddings;
   creating, by the computing device, a plurality of column embeddings using the sample embeddings;
   storing, by the computing device, the plurality of column embeddings in a content store;
   receiving, by the computing device, a natural language search query;
   determining, by the computing device, a filtering phrase in the natural language search query using a natural language understanding model;
   encoding, by the computing device, the filtering phrase using the same semi- supervised algorithm used to encode the samples;
   retrieving, by the computing device, the plurality of column embeddings from the content store and loading the retrieved plurality of column embeddings into memory;
   for each of the plurality of column embeddings, the computing device determining a similarity score based on a similarity between the encoded filtering phrase and the column embedding; and
   outputting, by the computing device, a column of the plurality of columns of the dataset that is most similar to the filtering phrase in the natural language query based on the column corresponding to column embedding of the plurality of column embeddings having a highest similarity score.

2. The method according to claim 1, wherein the filtering phrase is an expression that limits results returned in response to the natural language search query.

3. The method according to claim 1, wherein the encoding the filtering phrase comprises using word embedding techniques to create a filtering phrase word embedding.

4. The method according to claim 3, wherein the filtering phrase contains a plurality of words, and each of the plurality of words is mapped to a vector of real numbers to create a plurality of word embeddings.

5. The method according to claim 4, wherein the plurality of word embeddings is averaged, summed, or element-wise maximized to create the filtering phrase word embedding.

6. The method according to claim 1, wherein the encoding the filtering phrase comprises using a sentence encoder to create a filtering phrase word embedding.

7. The method according to claim 1, wherein the similarity score is determined using Cosine similarity.

8. The method according to claim 1, wherein the similarity score is determined using Euclidian distance.

9. The method according to claim 1, further comprising executing, by the computing device, a query based on the natural language search query and filtering on the column corresponding to the column embedding having the highest similarity score.

10. The method according to claim 1, wherein each of the columns in the dataset is encoded using multiple vectors by:
    applying clustering over the sample embeddings for each of the columns in the dataset; and
    selecting a number of vectors to represent each column via hyperparameter tuning and based on system resources.

11. A system comprising:
    a processor, one or more computer readable storage media, and program instructions collectively stored on the one or more computer readable storage media, the program instructions executable to:
    collect samples from a plurality of columns of a dataset;
    encode the samples using a semi-supervised algorithm, thereby creating sample embeddings;
    create a plurality of column embeddings using the sample embeddings;
    store the plurality of column embeddings in a content store;
    receive a natural language search query;
    determine a filtering phrase in the natural language search query, wherein the natural language search query comprises a sentence or sentence fragment that includes the filtering phrase;
    encode the filtering phrase using the same semi-supervised algorithm used to encode the samples;
    retrieve the plurality of column embeddings and load the plurality of column embeddings into memory;
    for each of the plurality of column embeddings, determine a similarity score based on a similarity between the encoded filtering phrase and the column embedding; and output a respective column of the plurality of columns of the dataset, the respective column corresponding to a column embedding of the plurality of columns embeddings having a highest similarity score.

12. The system according to claim 11, wherein the filtering phrase is an expression that limits results returned in response to the natural language search query.

13. The system according to claim 11, wherein the encoding the filtering phrase comprises using word embedding techniques to create a filtering phrase word embedding.

14. The system according to claim 13, wherein the filtering phrase contains a plurality of words, and each of the plurality of words is mapped to a vector of real numbers to create a plurality of word embeddings.

15. The system according to claim 14, wherein the plurality of word embeddings is averaged, summed, or element-wise maximized to create the filtering phrase word embedding.

16. The system according to claim 11, wherein the encoding the filtering phrase comprises using a sentence encoder to create a filtering phrase word embedding.

17. The system according to claim 11, wherein the similarity score is determined using Cosine similarity.

18. The system according to claim 11, wherein the similarity score is determined using Euclidian distance.

19. The system according to claim 11, the program instructions further being executable to execute a query based on the natural language search query and filter on the column corresponding to the column embedding having the highest similarity score.

* * * * *